United States Patent
Christie et al.

(10) Patent No.: US 6,203,906 B1
(45) Date of Patent: Mar. 20, 2001

(54) ABRASION RESISTANT POLYMER

(75) Inventors: Robert Michael Christie, Maidenhead; Kenneth Arthur Evans; Jennifer Carolyn Southern, both of Bucks; Richard John Cowton, Sunbury-on-Thames, all of (GB)

(73) Assignee: Alcan International Limited, Montreal (CA)

( * ) Notice: Subject to any disclaimer, the term of this patent is extended or adjusted under 35 U.S.C. 154(b) by 0 days.

(21) Appl. No.: 09/331,071

(22) PCT Filed: Jan. 9, 1998

(86) PCT No.: PCT/GB98/00060

§ 371 Date: Aug. 13, 1999

§ 102(e) Date: Aug. 13, 1999

(87) PCT Pub. No.: WO98/30625

PCT Pub. Date: Jul. 16, 1998

(30) Foreign Application Priority Data

Jan. 10, 1997 (EP) .................................................. 97300130

(51) Int. Cl.[7] .............................. D02G 3/00; C09B 67/50
(52) U.S. Cl. ...................... 428/372; 428/327; 428/323; 428/375; 106/412; 106/416; 524/444
(58) Field of Search ..................................... 428/323, 322, 428/375, 327; 106/412, 416; 51/298; 524/444

(56) References Cited

U.S. PATENT DOCUMENTS

| | | | |
|---|---|---|---|
| 4,174,226 | 11/1979 | Fitzpatrick et al. | |
| 4,627,950 | * 12/1986 | Matsui et al. | 264/103 |
| 5,669,941 | * 9/1997 | Peterson | 51/295 |
| 5,975,988 | * 11/1999 | Christianson | 451/28 |
| 5,997,625 | * 12/1999 | Londo et al. | 106/486 |

FOREIGN PATENT DOCUMENTS

| | | |
|---|---|---|
| 4426831A1 | 2/1996 | (DE) . |
| 172567A2 | 2/1986 | (EP) . |

OTHER PUBLICATIONS

Abstract of Japanese Patent Publication No. JP 10–09247, World Patent Index, Identification No. XP–002059986, (Jan. 12, 1989).

English translation of German Patent Publication No. DE 44–26831 A–1, (Feb. 1, 1996).

English translation of Japanese Patent Publication No. JP 7–126497, World Patent Index, Identification No. XP–002059985, (May 16, 1995).

* cited by examiner

Primary Examiner—William Krynski
Assistant Examiner—J. M. Gray
(74) Attorney, Agent, or Firm—Cooper & Dunham LLP

(57) ABSTRACT

A polymer formulation of the kind including a polymer such as PVC or thermosetting polyester acrylic or epoxy and generally soft filler materials in an amount of 50–300 parts per 100 of resin, contains 0.05–5% of an abrasion-resistant additive which is silicon carbide or an α-alumina selected from calcined unground alumina having a median crystallite size of at least 5.5 μm, and calcined and ground alumina having a median particle size of at least 3.0 μm, and tabular alumina. Shaped products and coating films formed from such formulations are also included.

13 Claims, 2 Drawing Sheets

ABRASION RESISTANT POLYMER

This invention concerns polymer formulations, particularly those which are curable to provide rigid or semi-rigid products. It also concerns paint formulations, as liquid paints or powder coating compositions. An object of the invention is to confer improved abrasion resistance on cured products or paint films derived from such formulations.

The majority of fillers and pigments used in polymer formulations and paints are relatively soft and do not by themselves provide good abrasion resistance. It is known that abrasion resistance can be improved by incorporating in the formulation a relatively small proportion of a harder material. Thus JP-A-7-179616 describes artificial marble containing 0.2–5% by volume of fused alumina. But fused alumina is formed by melting aluminium oxide by heating at a temperature above 2000° C. followed by crushing and grinding the resultant cooled fused alumina, and commands a premium price. This invention results from the discovery of cheaper materials which can provide excellent abrasion resistance.

It might appear easy to improve the abrasion resistance of a polymer formulation by adding to it a relatively hard filler in a relatively high concentration sufficient to provide the desired abrasion resistance. But various disadvantages result from the incorporation of too much hard filler into a polymer formulation: the mechanical properties of the polymer may be spoiled; the colour and appearance of the product may be spoiled; the shaped and cured product may be difficult or impossible to cut or machine; the mouldable polymer formulation or paint may itself be abrasive and may damage the equipment used to handle it. These problems may be solved by using only a small concentration of a suitable hard filler to provide the desired abrasion resistance without its attendant disadvantages. This invention results from the discovery of such materials.

In U.S. Pat. No. 3,928,706 are described wear-resistant decorative laminates formed by applying to fibrous sheets a layer based on a thermosetting resin and an abrasion-resistant additive which is, however, used in a rather high concentration.

In U.S. Pat. No. 4,713,138 are described abrasion-resistant decorative laminates formed by applying to fibrous sheets a composition containing a thermosetting resin and an abrasion-resistant powder as the major or only filler material.

In one aspect the invention provides a formulation comprising as the major component a polymerisable monomer or polymer and optional filler materials, wherein there is present as an abrasion-resistant additive from 0.05–5% by weight on the weight of the non-fugitive content of the formulation of silicon carbide or an $\alpha$-alumina selected from at least one of: calcined unground alumina, calcined and ground alumina, and tabular alumina.

These formulations may be solid or semi solid or fluid mixes of the kind which are cast, moulded or extruded to form shaped products, which term is used to include sheet. These products are preferably rigid or semi-rigid and have plastic rather than elastic properties. Examples of such products where abrasion resistance is important include worktops such as kitchen worktops and floor tiles. Other formulations according to the invention include paints, both liquid paints and powder coating compositions, particularly of the kind where an applied paint film is cured to provide an abrasion resistant coating. The invention also includes fibres and other articles, whose shape and nature are not material to the invention, whose surface is coated with a film derived from such a liquid paint or powder coating composition.

The formulation may be thermoplastic but is preferably thermosetting. The formulation may be converted to a shaped product simply by removal of water or other volatile component. More usually a step of polymerisation or cross linking or curing the shaped product will be included, which step may be effected by heat or radiation or chemicals or other conventional means. Thus in another aspect the invention provides a shaped product of the kind comprising a polymer and optional filler materials, wherein there is present as an abrasion-resistant additive from 0.05–5% by weight on the weight of the product of silicon carbide or an $\alpha$-alumina selected from at least one of: calcined unground alumina, calcined and ground alumina, and tabular alumina.

The polymer is preferably a synthetic resin and may for example be polyester, acrylic, epoxy, PVC, polyolefin, polystyrene, polyamide, polyurethane, alkyds, etc. Preferred are PVC and thermosetting polyester, acrylic and epoxy resin formulations. Or the formulation may contain a polymerisable monomer (or oligomer) such as for example methyl methacrylate. Thus methyl methacrylate monomer (or oligomer) might have been present in the formulation of Example 2 below, as well as or instead of the resin.

The formulation generally contains a filler. The nature of the filler is not material to the invention, and those conventional in the field may be used, including inorganic particulate fillers such as calcium carbonate, magnesium carbonate, talc, fibrous fillers e.g. wollastonite, titanium dioxide and other white and coloured pigments, aluminium trihydroxide, China clay, silica, etc. Such fillers generally have a hardness of less than about 7 on the Mohs' scale, in contrast to the abrasion resistant additives described herein which have a Mohs' hardness much greater than 7. The proportion of filler is up to 400 phr e.g. 10–400 phr or 50–300 phr preferably 100–250 phr (parts by weight per hundred parts by weight of resin). Of particular interest is aluminium trihydroxide which, by virtue of having a refractive index of 1.50–1.57 about the same as many synthetic resins, can be used as a flame-retardant filler which confers a translucent rather than a white appearance on the product.

The filler may be useful to control the colour or opacity of the polymer, or to provide fire-resistant properties, or may be present simply to reduce the cost of the product. In some cases a filler is not necessary. Example 4 below shows a rigid PVC formulation whose fire resistance was adequate, and which did not require a filler for any other reason. Formulations containing substantial proportions of plasticisers or other materials are likely to require a fire-resistant filler. Thus the flexible PVC formulation shown in Example 5 contained aluminium trihydroxide.

The formulation may also contain other conventional additives such as dyes, stabilisers, polymerisation regulators, anti-blocking agents, flame retardants, smoke suppressants, ultra violet absorbents, anti-static agents, titanates, zirco aluminates, organometallic compounds, surfactants, etc. Wetting agents and silanes may be included to improve initial wear resistance. Particularly in aqueous compositions, microcrystalline cellulose particles may be included. (See U.S. Reissue Pat. No. 32,152). Particulate PTFE or polyamide resin materials may be included as anti scuffing agents. All these conventional additives may be used in conventional concentrations. Preferably the non-fugitive part of the polymer formulation consists essentially of the polymerisable monomer or polymer and optional filler materials and the abrasion-resistant additive, as described above, together optionally with one or more of these conventional additives.

A distinction is made herein between fugitive components, which disappear, typically by volatilisation, during the conversion of the formulation to a shaped polymer product or coating; and non-fugitive components which remain in the shaped polymer product or coating. Water and volatile organic solvents are examples of fugitive components. Methyl methacrylate is an example of a non-fugitive component, which though to some extent volatile, substantially remains in the shaped polymer product or coating.

This invention is characterised by the use of 0.05–5% by weight, preferably 0.1% to 3% and particularly 0.2–1% or 2% by weight on the weight of the formulation, of silicon carbide or preferably a substantially α-alumina which confers abrasion resistance on surfaces (which may be shaped products or paint films) formed from the polymer formulations of the invention. If too little abrasion resistant additive is used, then the improvement in abrasion resistance may be not noticeable. If too much abrasion resistant additive is used, then various problems may arise: the mechanical properties or the colour of the product may be harmed; the product may be difficult or impossible to cut or machine; the polymer formulation may be so abrasive that handling equipment, e.g. moulding or extruding equipment, may be damaged.

The α-alumina is preferably calcined alumina. Calcined alumina is formed by heating a precursor, such as aluminium trihydroxide from the Bayer process, at temperatures in the range 1100–1400° C. Typical commercial calcined aluminas have an alpha alumina content of greater than 90% by X-ray diffraction. They are referred to herein as α-alumina. The particle size of the calcined alumina is quite variable, depending on that of the precursor, but the particles consist of agglomerates of primary crystals. The primary crystal size depends on the calcination conditions, such as temperature and presence of crystal growth modifiers, but is commonly below 10 $\mu$m in diameter although larger sizes are known. The particles are typically quite porous and readily grindable. Two forms of this calcined alumina are envisaged for use in the present invention. A first is an unground product. The median crystallite size is determined by a grinding test (described in the experimental section below). It has unexpectedly been found that calcined alumina with a relatively large crystallite size provides even better abrasion resistance than does unground calcined alumina with a smaller crystallite size. This unground product preferably has a median crystallite size of at least about 5.5 $\mu$m.

The other form of calcined alumina that is envisaged for use in the present invention is a ground product. This ground product preferably has a median particle size of at least 3.0 $\mu$m e.g. at least 5.5 $\mu$m particularly at least 11 $\mu$m. (Gloss retention may be improved if the particles have a maximum size not greater than about 9 $\mu$m, but this may conflict with their desired anti-abrasion properties.) Grinding of calcined alumina reduces its particle size to an extent that is related to its primary crystallite size. Many calcined aluminas readily grind down to a median particle size below 5.5 $\mu$m or even below 3.0 $\mu$m and are on this account less suitable for use in the present invention.

Or the α-alumina additive may be tabular alumina. Tabular alumina may be made by taking milled, calcined alumina, forming this into spheres which are heated at sintering temperatures of 1815–19250° C. and then crushed or ground to the desired size. While this does not cause melting (α-alumina melts at 2015° C.) it does cause sintering and substantial crystallite enlargement typically to a crystallite size of 250–300 $\mu$m. This process involves an additional step which substantially increases the cost.

The median particle size range of the abrasion resistant additives used in the present invention is preferably from 3 or 6–250 $\mu$m. Above 250 $\mu$m, particles tend to roughen the surface of the product. If the median particle size is too small, then an improvement in abrasion resistance is not noticed. Preferably the median particle size is at least 25 $\mu$m e.g. 30–200 $\mu$m.

The invention envisages not only the formulations described above, but also products made from them. These include products that have been shaped, e.g. by casting, moulding or extrusion, and cured, such as for example worktops and floor tiles. Also included are articles whose surface is coated with a film of the polymer formulation in the form of a paint.

Reference is directed to the accompanying drawings in which.

EXAMPLE 1

Plaque Production

Figure 1:
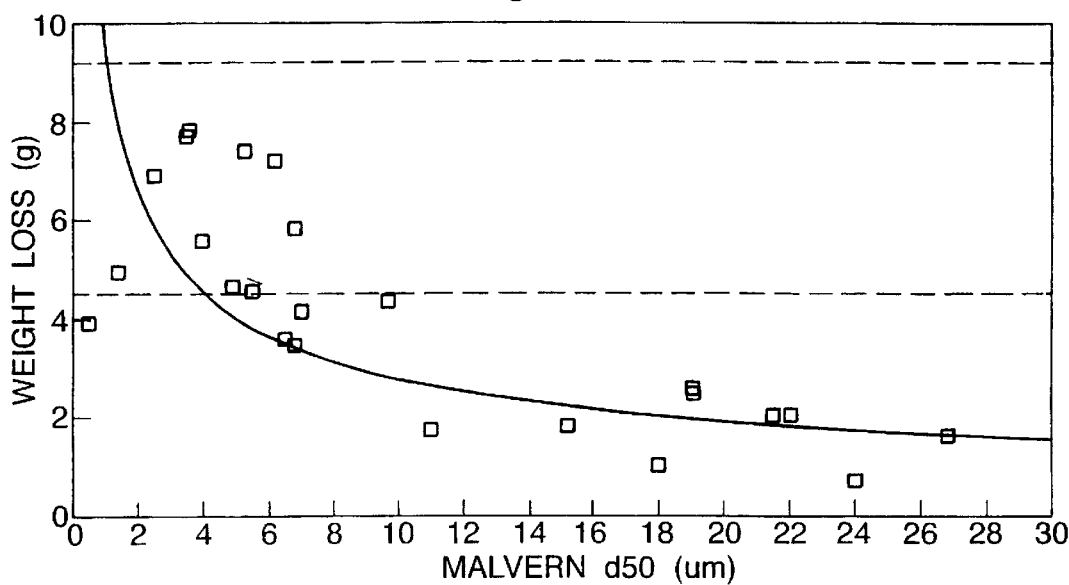
FIG. 1 is a graph of abrasion resistance against median particle size of various calcined and milled alumina products.

Approximately 120 g of polyester resin was weighed into a flanged quick fit reaction vessel. This was placed in a water bath held at 30° C. A filler (aluminium trihydroxide or calcium carbonate) was then weighed out such that its total weight was 1.5 times that of the resin (i.e. 60% of the total formulation consisted of filler). The filler included 0.75 wt % of an abrasion resistant additive as indicated in the table below. Whilst stirring the filler was added slowly, minor component first, to the resin. After adding all of the filler, the mix was stirred for a further 5 to 10 minutes. After attaching a multi-necked flask cover, and whilst still stirring, a vacuum of 200 mbar was applied for 20 minutes to remove any entrapped air. MEKP catalyst was then added (1.75% of resin weight) and stirred into the mix, which was still held under vacuum for 2 minutes. The vacuum was then released the mix poured into four moulds 4 cm in diameter. The samples were then placed in an oven at 100° C. for 1 hour to cure.

Indicative Abrasion Test

An indicative abrasion test involved placing the four 4 cm diameter plaques into a holder suitable for an automatic polisher. The plaques were then wet polished flat using P120 SiC grit paper. The plaques and holder were then dried and the whole assembly was weighed. Using a new P120 SiC grit paper the plaques were then repolished for 20 minutes under a pressure of 44.5 N. After drying and weighing the individual disk weight loss was then calculated.

The silicon carbide used was manufactured by Fujimi Incorporated—grade C sizes #280, #360 and #700.

The results are set out in the following table. The samples with no additive or fused alumina are included for comparative purposes.

TABLE 1

Abrasion Resistance in Polyester filled with Aluminium Trihydroxide or Calcium Carbonate.

| Abrasion Resistant Additive | Malvern $d_{50}$ ($\mu$m) | Plaque weight loss (g) |
| --- | --- | --- |
| None | — | 8.09 |
| Fused alumina | 117.1 | 0.41 |
| " | 114.4 | 0.55 |

TABLE 1-continued

Abrasion Resistance in Polyester filled with Aluminium Trihydroxide or Calcium Carbonate.

| Abrasion Resistant Additive | Malvern $d_{50}$ (μm) | Plaque weight loss (g) |
|---|---|---|
| Silicon carbide | 65.6 | 0.21 |
| " | 49.2 | 0.24 |
| " | 24 | 0.45 |
| Tabular alumina | 231.1 | 0.48 |
| " | 133.9 | 0.33 |
| " | 106.2 | 0.37 |
| " | 78 | 0.55 |
| " | 74.9 | 0.48 |
| " | 52.9 | 0.56 |
| " | 31.4 | 0.83 |
| " | 12.6 | 1.45 |
| Calcined and milled alumina | 26.8 | 0.81 |
| " | 19 | 2.18 |
| " | 15.2 | 1.03 |
| " | 9.7 | 3.27 |
| Calcined unmilled alumina | 92 | 0.99 |
| " | 77.5 | 1.78 |
| " | 59.3 | 4.13 |

EXAMPLE 2

100 g of aluminium trihydroxide filler was mixed with 66.67 of a mix of methyl methacrylate resin and curing agents and 1 g (or less where indicated) of alumina or silicon carbide abrasion resistant additive. The mixture was stirred, degassed under vacuum and cast into two 4 cm diameter cylindrical moulds to cure.

The cast cylinder was abraded using 120 grit (125 μm) silicon carbide polishing paper on the polishing machine with 44.5N pressure at 200 rpm for ten minutes with water as a lubricant. The weight loss of the cylinder was measured.

It may be noted that 1 g and 0.5 g and 0.2 g of alumina or silicon carbide represent 0.6% and 0.3% and 0.12% by weight respectively on the weight of the polymer formulation.

The results are given in Table 2.

TABLE 2

Abrasion Resistance in Polymethyl Methacrylate filled with Aluminium Trihydroxide.

| Abrasion Resistant Additive (1 g unless stated) | Malvern $d_{50}$ (μm) | Cylinder weight loss g |
|---|---|---|
| None | — | 4.51–9.22 Average 7.05 |
| Fused Alumina | 117.1 | 0.98 |
| | 114.4 | 0.97 |
| | 19 | 2.46 |
| | 18 | 1.01, 1.00 |
| Silicon Carbide | 65.6 | 0.48 |
| | 49.2 | 0.59 |
| | 24.0 | 0.70 |
| Tabular Alumina | 21.5 | 2.03 |
| Calcined and Milled Alumina | 26.8 | 1.60 |
| | 22 | 2.03 |
| | 19 | 2.57 |
| | 15.2 | 1.73, 1.87 |
| | 11 | 1.72 |
| | 9.7 | 4.33 |
| | 7.0 | 4.14 |
| | 6.8 | 3.46 |
| | 6.8 | 5.8 |
| | 6.5 | 3.58 |
| | 6.2 | 7.19 |
| | 5.5 | 4.54 |
| | 5.3 | 7.39 |
| | 4.9 | 4.63 |
| | 4.0 | 5.56 |
| | 3.6 | 7.82 |
| | 3.5 | 7.70 |
| | 2.5 | 6.90 |
| | 1.4 | 4.93 |
| | 0.5 | 3.92 |
| Calcined Unmilled Alumina | 103.6 (2.5) | 7.30 |
| | 96 (7.0) | 4.51 |
| | 92 (7.8) | 1.81, 1.77 |
| | 84.6 (4.0) | 7.27 |
| | 77.5 (6.5) | 2.90 |
| | 76.4 (6.2) | 3.44 |
| | 73.8 (6.8) | 2.75 |
| | 73.3 (5.3) | 7.16 |
| | 64.9 (3.5) | 6.85 |
| | 59.3 | 5.74 |
| | 32.2 | 8.45 |
| | 28.8 (4.9) | 7.04 |
| | 28.5 (6.8) | 5.24 |
| 0.5 g Calcined Milled Alumina | 15.2 | 2.78 |
| 0.2 g Calcined Milled Alumina | 15.2 | 4.75 |

( ) Primary crystal size by milling method.

FIG. 1 of the accompanying drawings is a graph of abrasion resistance, measured as weight loss, against median particle size of a variety of calcined and milled alumina products. The data is taken from Table 2. It can be seen that the median particle size of the calcined and milled product has a marked effect on the abrasion resistance of the polymer formulation in which it is incorporated. Milled products having a median particle size of at least 5.5 μm preferably at least 12 μm are preferred for the present invention.

Figure 2:
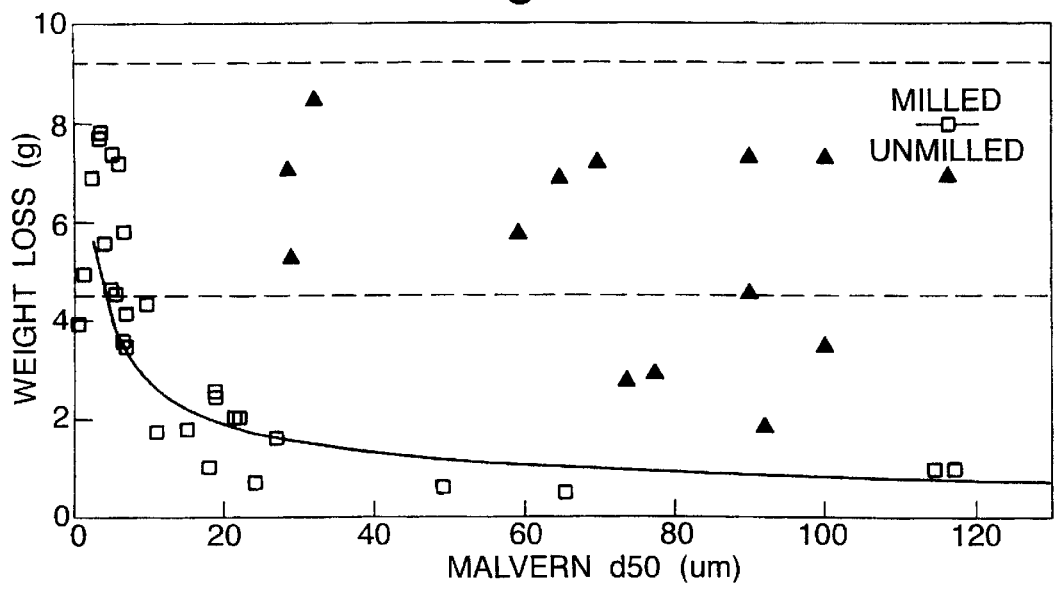
FIG. 2 is a graph of abrasion resistance against median particle size for both milled and unmilled calcined aluminas.

FIG. 2 is a graph of abrasion resistance measured as weight loss, against median particle size of various calcined alumina products both milled and unmilled. The data for the milled products is the same as shown in FIG. 1, though the scale is here different. So far as the calcined but unmilled products are concerned, some give an acceptable abrasion resistance (e.g. a weight loss below 4.5 g) and others do not, and there appears to be little correlation between median particle size and abrasion resistance.

Some calcined but unmilled aluminas were then ground under the following conditions: 100 g alumina with 100 g deionised water were ground for two hours in a 1 dm³ porcelain (Pascall) pot with 1 kg alumina ceramic grinding media at about 60 rpm. The median particle size of the milled alumina was determined using a Malvern Mastersizer instrument. This median particle size is regarded as a measure of the primary crystal size of the alumina.

Figure 3:
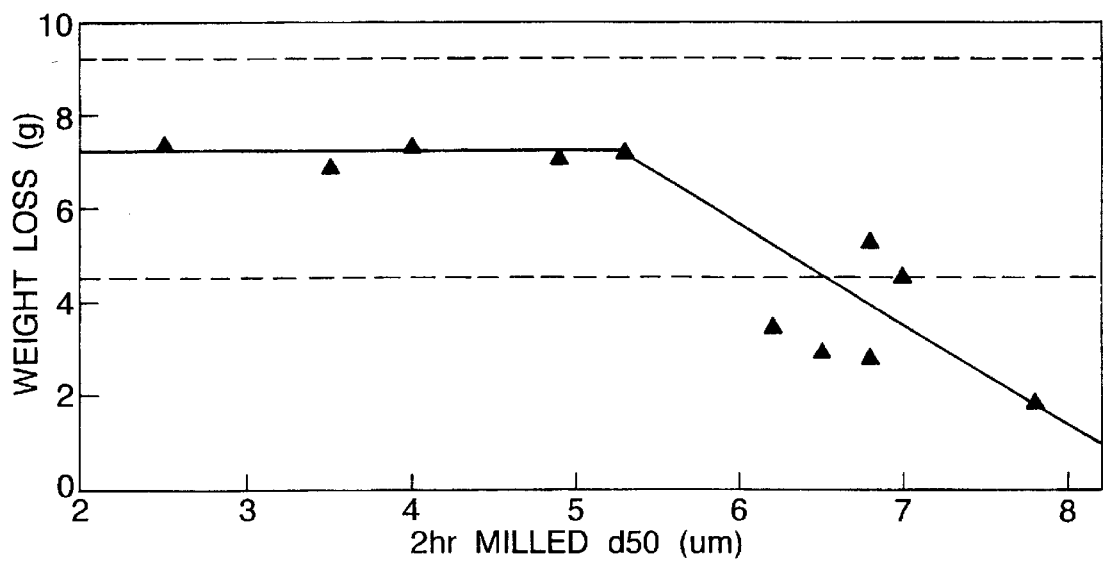
FIG. 3 is a graph of abrasion resistance of unmilled calcined aluminas against crystallite size.

The results are shown in Table 2 and in FIG. 3, which is a graph of abrasion resistance, expressed as weight loss, of specified calcined unmilled alumina products, against the median particle size of those products after 2 hours milling, which size is assumed to correspond to the primary crystallite size of those products. It can be readily seen that products with a primary crystallite size above about 5.5 μm were able to provide improved abrasion resistance (weight loss below 4.5 g) whereas those with a primary crystallite size below 5.5 μm were not.

EXAMPLE 3

| Epoxy resin formulation (parts by weight) | |
|---|---|
| Epoxy resin (RS4025 made by Astor Stag Ltd) | 100 |
| Curing agent (SER659 of Astor Stag Ltd) | 33 |
| Aluminium trihydroxide | 200 |
| Calcined and ground alumina (median particle size 15.2 μm) | varies |

The calcined and ground alumina and the aluminium trihydroxide were added to the epoxy resin and degassed under vacuum. The curing agent was added and the mixes were cast. After a period of 24 hours at room temperature, the casts were heat treated at a temperature of 80° C. for 3 hours. Abrasion resistance was determined as described in Example 1.

Results are set out in Table 3 below. The abrasion resistance of the epoxy resin was quite rapidly improved on adding small quantities of calcined and ground alumina. The results were not as good as those found for polyester resin (in Example 1) where the addition of 0.75% of the same calcined and ground alumina produced an abrasion weight loss of 1.03 g. This was due to the fact the epoxy casts were softer than the polyester casts under the conditions used; specifically, the epoxy resin cast had a Vickers hardness ($H_v$) of 20.39, compared to a hardness figure of 36.72 for the polyester resin of Example 1. However the use of alternative curing agents would be expected to make the epoxy casts harder and thus improve the abrasion results (i.e. lower the amount of calcined and ground alumina required).

TABLE 3

Indicative Abrasion Resistance of Filled Epoxy Resin

| Calcined and ground alumina (% of aluminium trihydroxide weight used) | Plaque weight loss |
|---|---|
| 0.00 | 10.19 |
| 0.75 | 2.16 |
| 1.50 | 1.49 |
| 3.00 | 0.99 |

EXAMPLE 4
Rigid PVC Formulation
Experimental

PVC (DS7060 from Hydropolymers Ltd.), calcium stearate and calcined and ground alumina (median particle size 15.2 μm) were mixed together manually. IRGASTAB 17M (Trademark) tin stabiliser of Ciba-Geigy and Epoxy Soya Lankroflex ED6 (ACKROS) (viscosity modifier) were then added and mixed in. The mix was placed on a two roll mill at 140° C. and allowed to warm for 5 minutes to ease processing. The mill was then started and the compound was milled and re-mixed several times. The mix was then removed from the mill and allowed to cool.

For each mix four plaques, 5×50×10 mm, were compression moulded. This involved initially heating the sample at 180° C. for 5 minutes under no pressure followed by 10 minutes under 20 tonnes of pressure over a 12 cm diameter ram.

The abrasion resistance of the plaques was assessed in the same manner as before the only difference being the previous test pieces were circular (40 mm diameter) rather than rounded cornered squares.

TABLE 4

Composition of rigid PVC Formulation

| Material | Quantity (phr) |
|---|---|
| PVC | 100.00 |
| Tin Stabiliser | 2.00 |
| Calcium Stearate | 2.00 |
| Viscosity Modifier | 3.00 |
| Calcined and ground alumina | 0, 0.25, 0.50, 0.75, 1.50 or 3.00 |

Results and Discussion

The results of adding calcined and ground alumina into the rigid PVC formulation are given in Table 5. It was found that the abrasion resistance of the rigid PVC was improved rapidly upon adding small amounts of calcined and ground alumina.

TABLE 5

Indicative Abrasion Resistance of Filled Rigid PVC

| Calcined and ground alumina (% of PVC used) | Plaque weight loss (g) |
|---|---|
| 0.00 | 5.15 |
| 0.25 | 0.52 |
| 0.50 | 0.38 |
| 0.75 | 0.35 |
| 1.50 | 0.25 |
| 3.00 | 0.13 |

Note: On a volume basis, 0.5% calcined and ground alumina in PVC is approximately equivalent to 0.75% calcined and ground alumina in the filled polyester system of Example 1. A comparison of the two systems is given in Table 6. Despite being much softer, the rigid PVC system gives a reduction in weight loss which is greater in % terms. This is probably because it does not contain any other particles which may compromise the polymer matrix.

TABLE 6

Weight Loss and Hardness of Rigid PVC and Filled Polyester Resin

| Sample | Weight loss of unfilled plaque | Weight loss of plaque containing calcined and ground alumina | Barcol Hardness |
|---|---|---|---|
| Rigid PVC (0.5% calcined and ground alumina) | 5.15 g | 0.38 g | 11.40 |
| Filled Polyester resin (0.75% calcined and ground alumina) | 8.09 g | 1.03 g | 61.00 |

EXAMPLE 5
Flexible PVC
Experimental

PVC (DS7060 from Hydropolymers Ltd), aluminium trihydroxide (Superfine SF4E from Alcan Chemicals Ltd), IRGASTAB EZ-712 (Trademark) stabiliser from Ciba-Geigy and calcined and ground alumina (median particle size 15.2 μm) were mixed together manually. Di-iso-octyl phthalate was then added and mixed in. The mix was placed on a two roll mill at 140° C. and the compound milled and re-mixed several times. The mix was then removed from the mill and allowed to cool.

For each mix, five round cornered plaques measuring 50×50×10 mm were compression moulded. This involved initially heating the sample at 150° C. for 1 minute under no pressure followed by 3 minutes under 20 tonnes of pressure over a 12 cm diameter ram.

TABLE 7

Composition of Flexible PVC Formulation

| Material | Quantity (phr) |
| --- | --- |
| PVC DS7060 | 100.00 |
| Aluminium Trihydroxide (SF4E) | 60.00 |
| Di-iso-octyl Phthalate | 50.00 |
| IRGASTAB EZ-712 (TRADEMARK) stabilizer | 5.00 |
| Calcined and ground alumina | 0, 1.61, 3.22 or 6.45 |

Four of the plaques were used to find the abrasion resistance using the method used in previous examples.

Results and Discussion

The results of adding calcined and ground alumina into the so flexible PVC formulation, and testing by the method used for previous testwork, are given in table 8. It was found that the abrasion resistance of the flexible PVC was improved upon adding small amounts of calcined and ground alumina.

TABLE 8

Indicative Abrasion Resistance of Filled Flexible PVC

| Calcined and ground alumina (% of PVC used) | Plaque weight loss (g) |
| --- | --- |
| 0.00 | 6.23 |
| 1.61 | 1.83 |
| 3.22 | 0.34 |
| 6.45 | 0.08 |

EXAMPLE 6

| Coating Powder Formulation (parts by weight) | |
| --- | --- |
| Carboxylated Polyester (Uralac P2400 from DSM Resins) | 558 |
| Triglycidyl isocyanate curing agent | 42 |
| Flow agent | 10 |
| Titanium dioxide | 400 |

The above components were dry blended and then melt compounded in a twin screw extruder using standard processing parameters. The extrudate was rapidly cooled, kibbled, ground to a fine powder and passed through a 125 μm sieve to remove oversize particles.

The powder was separated into two portions. To one portion (98 g) was added 2 g of calcined and ground alumina having a median particle size of 15.2 μm, and the mixture thoroughly dry blended. The other portion of powder was used without addition.

Each powder was electrostatically sprayed using a spray gun on to a mild steel panel and stoved at 200° C. (metal temperature) for 10 minutes. The resulting coating was smooth, white and glossy. There was no visual difference between the two panels. Each panel was guillotined to produce 10 cm×10 cm test panels with a central hole for Taber abrasion test.

The white painted panels were subjected to 1000 cycles of a Taber abraser, operating in accordance with ASTM D4060 using CS10 wheels and 100 g load. The weight loss was determined at 500 and 1000 cycles and the abrasive wheels were refaced at 500 cycles intervals. The test was carried out at 21° C. Experiments were performed in duplicate, and the results are set out in the following Table 9.

TABLE 9

| Calcined and ground alumina | Weight loss after 500 cycles (g) | Weight loss after 1000 cycles (g) |
| --- | --- | --- |
| Absent | 28.5 | 58.1 |
| Present at 2% | 24.9 | 52.5 |

An improvement in abrasion resistance was obtained even though the alumina addition level and incorporation method were not optimised.

What is claimed is:

1. A formulation comprising as the major component a polymerisable monomer or polymer and optional filler materials, wherein there is present as an abrasion-resistant additive from 0.05–5% by weight on the weight of the non-fugitive content of the formulation of an α-alumina selected from at least one of: calcined unground alumina having a median crystallite size of at least 5.5 μm, calcined and ground alumina having a median particle size of at least 3.0 μm, and tabular alumina.

2. A formulation as claimed in claim 1, of the kind which is curable to provide a rigid or semi-rigid product.

3. A formulation as claimed in claim 1, wherein the polymer is PVC or a thermosetting polyester, acrylic or epoxy resin.

4. A formulation as claimed in, claim 1, wherein the abrasion-resistant additive is present in an amount of 0.2–1.0% by weight on the weight of the non-fugitive content of the formulation.

5. A formulation as claimed in claim 1, wherein as the abrasion-resistant additive there is used calcined and ground alumina having a median particle size of at least 12 μm.

6. A formulation as claimed in claim 1, wherein the polymer and filler materials are present in a weight ratio of 100:10–400.

7. A formulation as claimed in claim 1, wherein the non-fugitive part of the formulation consists essentially of the polymerisable monomer or polymer and optional filler materials and the abrasion-resistant additive.

8. A formulation as claimed in claim 1, wherein the polymer is selected from polyester, acrylic, epoxy, PVC, polyolefin, polystyrene, polyamide, polyurethane and alkyd resins.

9. A polymer formulation as claimed in claim 1 in the form of a paint or coating composition in liquid or in powder form.

10. A shaped product comprising as the major component a polymer and optional filler materials, wherein there is present as an abrasion-resistant additive from 0.05–5% by weight on the weight of the product of an α-alumina selected from at least one of: calcined unground alumina having a median crystallite size of at least 5.5 μm, calcined and ground alumina having a median particle size of at least 3.0 μm, and tabular alumina.

11. An article whose surface is coated with a film comprising a polymer and optional filler materials, wherein there is present as an abrasion-resistant additive from 0.05–5% by weight on the weight of the film of an α-alumina selected from at least one of: calcined unground alumina having a median crystallite size of at least 5.5 μm, calcined and ground alumina having a median particle size of at least 3.0 μm, and tabular alumina.

12. An article as claimed in claim 11, wherein the film is formed from a paint or coating composition in liquid or in powder form of a formulation comprising as the major component, a polymerisable monomer or polymer and optional filler materials, wherein there is present as an abrasion-resistant additive from 0.05–5% by weight on the weight of the non-fugitive content of the formulation of an α-alumina selected from at least one of: calcined unground alumina having a median crystallite size of at least 5.5 μm, calcined and ground alumina having a median particle size of at least 3.0 μm, and tabular alumina.

13. An article as claimed in claim 11 which is a fibre.

* * * * *